United States Patent [19]

Anderson, II

[11] Patent Number: 5,382,279

[45] Date of Patent: Jan. 17, 1995

[54] METHOD AND APPARATUS FOR COMBUSTION OF STEEL PLANT WASTES

[75] Inventor: Elmer D. Anderson, II, Valparaiso, Ind.

[73] Assignee: Bethlehem Steel Corporation, Bethlehem, Pa.

[21] Appl. No.: 179,022

[22] Filed: Jan. 7, 1994

[51] Int. Cl.6 .......................... C21B 13/00; C21B 1/24
[52] U.S. Cl. ........................ 75/746; 75/751; 75/765; 75/769; 75/772
[58] Field of Search ................. 75/746, 751, 765, 769, 75/772

[56] References Cited

U.S. PATENT DOCUMENTS

| | | | |
|---|---|---|---|
| 3,540,922 | 11/1970 | Brown | 75/765 |
| 4,123,257 | 10/1978 | Fukuoka | 75/772 |
| 4,177,062 | 7/1979 | Pack | 75/28 |
| 4,213,778 | 10/1989 | Sitz | 75/25 |
| 4,250,027 | 11/1981 | Cases et al. | 209/233 |
| 4,501,609 | 2/1985 | Druel | 75/769 |

FOREIGN PATENT DOCUMENTS 6187827 7/1984 Japan.
1149912 10/1989 Japan.

Primary Examiner—Peter D. Rosenberg
Attorney, Agent, or Firm—Joseph W. Berenato, III; Harold I. Masteller, Jr.

[57] ABSTRACT

A process for consuming oily sludge waste product in steel making operations includes spraying a waste slurry onto the moving porous bed of a sinter strand. A burner hood is spaced above a portion of the moving bed. The bed carries a sinter mix which is ignited in the ignition zone of the burner hood and the slurry is sprayed onto the ignited sinter mix immediately downstream of the ignition zone. A vacuum system draws the slurry through the ignited sinter mix ensuring substantially complete combustion of the slurry.

20 Claims, 2 Drawing Sheets

METHOD AND APPARATUS FOR COMBUSTION OF STEEL PLANT WASTES

RELATED APPLICATIONS

This patent application is related to the commonly owned U.S. Pat. application No. 08/178,671, filed on Jan. 6, 1994.

1. Field of the Invention

The present invention is directed to a method and apparatus for the combustion of waste material. In particular, this invention is directed to the combustion of oily sludge produced in steel making operations, by combustion of a slurry of the sludge in the steel making plant's existing sinter strand.

2. Background of the Invention

An integrated steel plant generally has a first facility, called the coke works, for transforming coal into coke, a second facility, called a blast furnace, for making iron, and a third facility, called the melt shop, for making steel from the iron. Each of the facilities has the potential for creating waste which must be collected and properly disposed of in order to avoid contamination of the air, ground, or water.

Each of the facilities uses water which may become contaminated by the operation or otherwise. Various treatment systems may be employed for the contaminated water, with secondary waste water treatment frequently occurring. Tertiary treatment, on the other hand, is generally too expensive to be economically feasible.

Typically, a secondary waste water treatment plant (WWTP) at the steel making plant receives waste from these and other facilities of the plant. The waste may come from primary treatment facilities, such as particulate filters where relatively large particulate material is removed to be directed for recycling or disposal, or thickeners, where chemicals may be added and/or water removed to cause agglomeration of smaller particulate matter to a size which may be more easily filtered.

The waste products received at the WWTP are treated to separate and remove the waste matter from the potable water. Typically, treatment at a WWTP comprises biological decomposition of organic matter using microorganisms. The potable water is then discharged to, for instance, a nearby stream or river or it may be directed for reuse within the plant. The dewatered waste separated from the clean water is commonly referred to as sludge or oily sludge. The sludge is a viscous material which is not readily pumped and which contains, among other things, grease, oil and other hydrocarbons and organic materials used in or created by the various facilities of the steel making plant.

Sludge created at the WWTP heretofore has been landfilled. However, some constituents of the sludge may volatilize at ambient temperatures so that landfilling is not an optimal method of disposal. Landfilling is also undesirable because of the potential for contamination of the ground and water. While the use of lined and capped landfills may reduce the risk of contamination of the ground and water, this is also expensive. Lined and capped landfills also do not address the issue of reducing the amount of land used for landfilling.

Burning is another alternative to landfilling. Facilities for burning waste include trash incinerators. However, while burning may be acceptable for certain solid wastes, it is generally not acceptable for sludges of the type described above which include volatile waste materials such as hydrocarbons. Trash incinerators may not include appropriate safeguards for preventing volatilization of materials before substantially complete combustion has occurred. In addition, an incinerator may allow discharge of uncombusted waste products into the air.

An integrated steel making plant generally has a sinter strand. A sinter strand is a machine for agglomerating iron-beating particulates into clinkers suitable for use in a blast furnace. Clinkers are produced by heating the particulates at a sufficiently high temperature to cause agglomeration of the particulates. The typical sinter strand includes a moving grate or bed, a burner hood located above or surrounding at least a portion of the grate, and a vacuum system located below the grate. A sinter mix, containing relatively small non-bearing materials and a carbon some, is placed on the grate ahead of the burner hood and ignited within the burner hood to create the clinkers. The vacuum system draws air, combustion gases, and fines through the sinter mix and grate for collection, processing and discharge. By the process and apparatus of the present invention, it has been found that WWTP sludge may be substantially completely combusted by injection onto the moving grate within the burner hood after the sinter mix has been ignited.

SUMMARY OF THE INVENTION

Generally speaking, the present invention fulfills the above-described needs by providing a method and apparatus for combusting volatile wastes, i.e. a means which ensures substantially complete combustion of all waste through injection of the waste into the burner hood of a sinter strand.

A method for combusting sludges comprises the steps of providing a sinter strand including a porous bed moveable between first and second ends, a burner hood surrounding the bed intermediate the ends, and a vacuum source operably associated with the hood for applying a vacuum thereto. Material to be sintered is deposited onto the bed at the fast end. The material is moved by the bed toward the second end, and ignited within the hood to cause sintering thereof. Volatile sludge, in the form of a slurry, is applied onto the ignited material within the burner hood, thereby causing the volatile material to be ignited and combusted within the hood. The ignited material continues to advance toward the second end.

Apparatus for the combustion of volatile sludge comprises a sinter strand having fast and second ends including a porous bed movable between the ends and for carrying material to be sintered, a burner hood having an inlet and an outlet located above a portion of the bed intermediate the ends, and a vacuum source operably associated with the bed for applying a vacuum thereto. A plurality of gas burners are located within the hood adjacent the inlet for igniting at least the surface of material, and spray nozzles are located within the burner hood downstream of the gas burners for applying sludge to the ignited material.

The method and apparatus for combusting waste of the present invention is found to be particularly useful in disposal of oily sludge wastes produced by steel making processes, as well as recovery and waste treatment processes utilized at steel making plants. The method and apparatus of the present invention are compatible with existing steel making operations and utilize existing steel making equipment.

These and other objects and advantages of the invention will be readily apparent in view of the following description and drawings of the above-described invention.

BRIEF DESCRIPTION OF THE DRAWINGS

The above and other advantages and novel features of the present invention will become apparent from the following detailed description of the preferred embodiment of the invention illustrated in the accompanying drawings, wherein.

DETAILED DESCRIPTION OF THE PREFERRED EMBODIMENT

Figure 1:
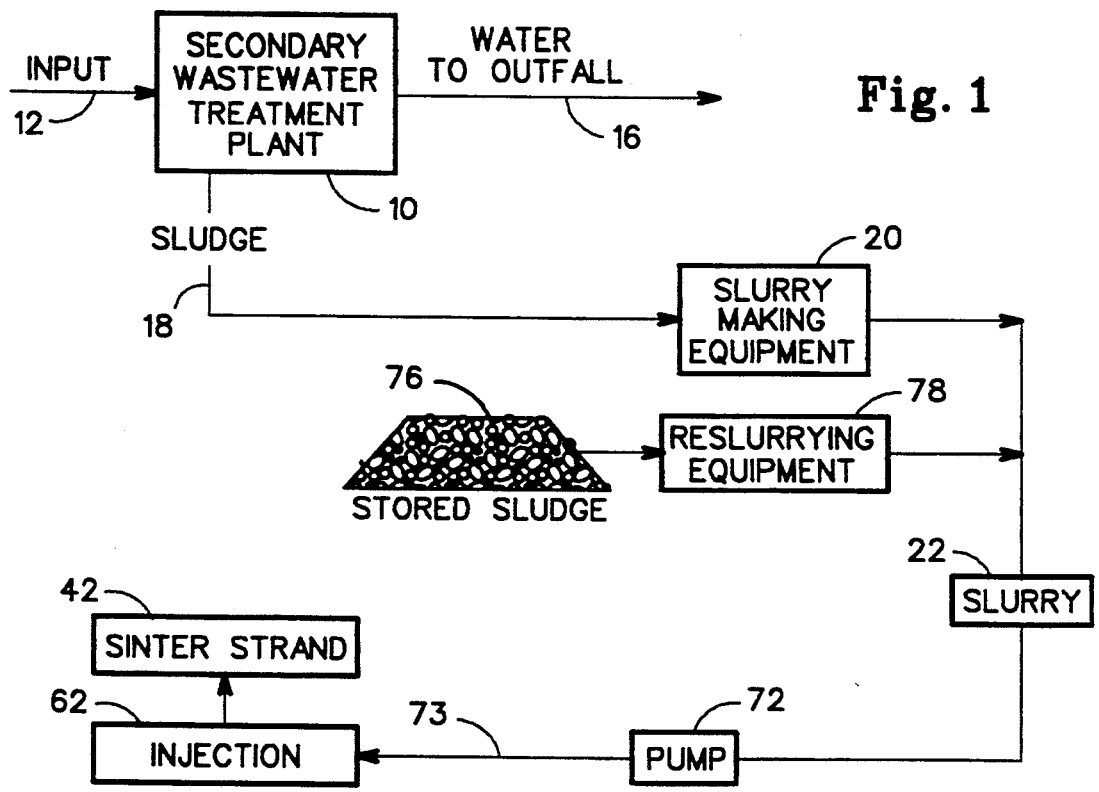
FIG. 1 is a block diagram of the process of the present invention.

As best shown in FIG. 1, secondary waste water treatment plant (WWTP) 10 receives liquid waste at input 12. This waste may include oils, greases, and various hydrocarbons from facilities of the steel making plant, such as hydrocarbon-contaminated mill scales and mill sludges collected from scale pits. WWTP 10 treats the waste material chemically or biologically or by filtering or dewatering or a combination of these or other well known processes. The output from WWTP 10 includes clean water 16 discharged to the outfall and oily sludge 18. Sludge 18 is about 30 to 35% solids, and includes various oils, organic materials, and other hydrocarbons. Sludge 18 is highly viscous and not readily pumped.

In the process of the present invention, sludge 18 is delivered to mixer 20 to produce slurry 22 which is pumpable and sprayable. As used herein, slurry is a suspension of a solid in a liquid. Mixer 20 adds water to the sludge 18 so that the slurry 22 has a solids content of about 25% by weight. In addition, large particulates are removed from the sludge 18 by screening. Screening removes particulate matter greater than about ⅛ inch to prevent clogging of delivery lines and spray nozzles.

Figure 2:
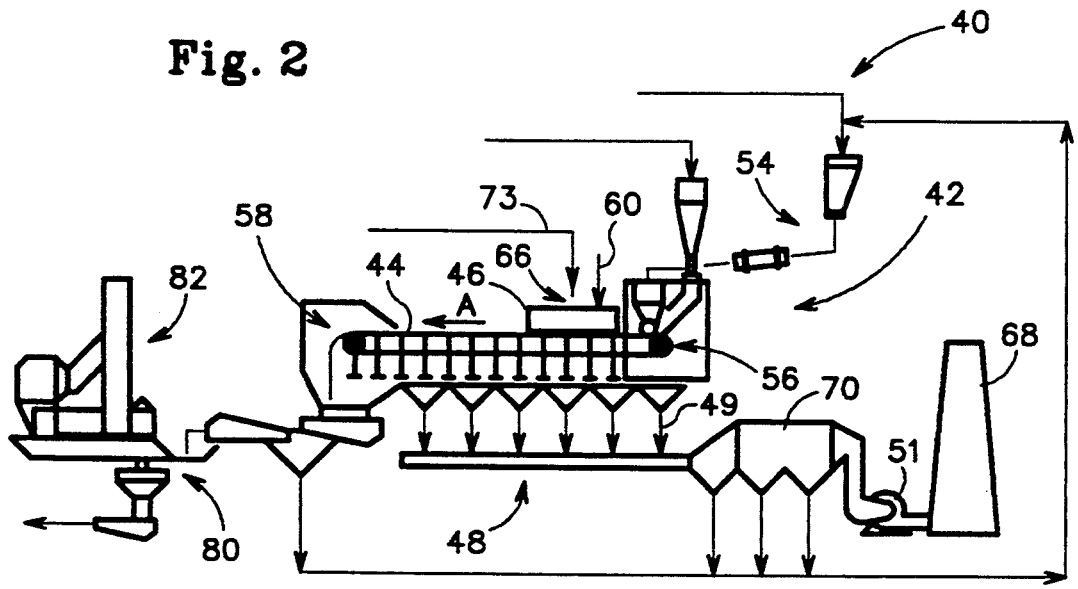
FIG. 2 is a schematic diagram of a sinter strand onto which waste is injected.

After conditioning sludge 18 at mixer 20, slurry 22 is delivered to sinter plant 40. Sinter plant 40, as best shown in FIG. 2, includes sinter strand 42 having porous moving bed 44, burner hood 46, and vacuum apparatus 48. The operating temperature of sinter strand 42 is from about 2300° F. to about 2700° F., a temperature above the ignition temperature of the organic constituents of slurry 22.

Figure 3:
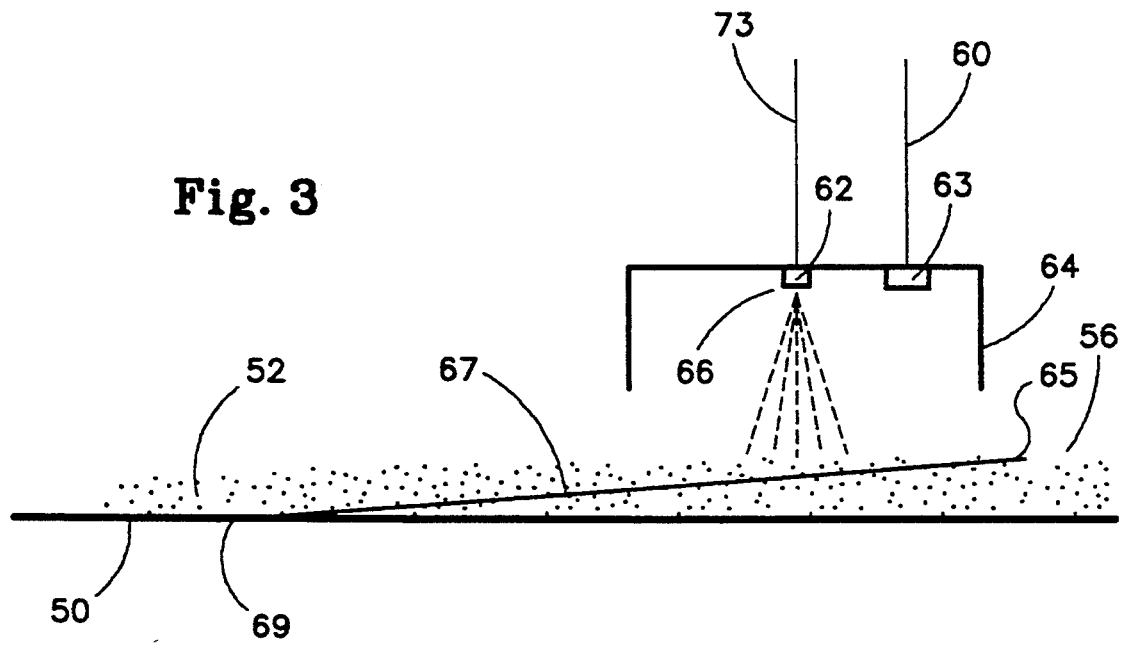
FIG. 3 is a fragmentary enlarged side elevational view of the sinter strand.

As best shown in FIG. 3, bed 44 of strand 42 includes grate 50 on which sinter mix 52 is carried. Grate 50 is continuous and carries sinter mix 52 in the direction of the arrow A of FIG. 2. Sinter mix 52 includes iron-bearing materials of a relatively small size, too small for use in other areas of the steel making plant including the blast furnace, and a carbon source such as approximately 5% coke breeze or anthracite. In addition, ore fines collected by vacuum apparatus 48 may be recycled onto bed 44. Sinter mix 52, as best shown in FIG. 2, is fed onto moving grate 50 by raw material feed supply 54 at the head 56 of sinter strand 42, upstream of burner hood 46. Processes known to those skilled in the art prepare and feed sinter mix 52 onto moving grate 50 to ensure that the permeability of bed 44 permits sufficient air and combustion gases to be drawn through during the sintering process. The product discharged at opposite end 58 is an agglomeration of the sintered iron particulates which is in a granular, relatively coarse form suitable for use in the blast furnace and commonly referred to as clinker.

Burner hood 46 is located above and may surround a portion of bed 44 and includes gas burners 63 for igniting the surface of bed 44 at 65 and nozzles 62 for spraying slurry 22 thereon. As best shown in FIG. 3, the sinter mix 52 carried by bed 44 is ignited by gas burners 63 communicating with gas supply lines 60 near the input end 64 of burner hood 46. Burner hood 46 may include additional gas burners along its length for ensuring ignition of sinter mix 52 as it is moved through burner hood 46 on moving grate 50. Nozzles 62 are located generally at 66 within burner hood 46 downstream of gas burners 63. Nozzles 62, positioned downstream of initial ignition point 65 of bed 44, help to ensure that mix 52 is ignited prior to having the water-containing slurry 22 sprayed thereon. Slurry 22 contains volatile materials having relatively low boiling points. Because slurry 22 is sprayed onto burning mix 52 downstream of ignition area 65, then the materials in slurry 22 are combusted within burner hood 46 before the materials can escape in uncombusted form into the atmosphere.

Vacuum apparatus 48, including vacuum lines 49 and vacuum pump 51, applies a vacuum to the underside of bed 44 along the length thereof, including the area below burner hood 46. The vacuum pulls air down through bed 44 to burn the fuel contained in sinter mix 52 by what is commonly referred to as downdraft combustion. In addition to drawing air through bed 44, vacuum apparatus 48 draws ore dust, fines, sprayed slurry 22, and combustion gases to and through bed 44. By applying slurry 22 to bed 44 from above and downstream of ignition point 65 and under the influence of the downdraft created by vacuum apparatus 48, substantially complete combustion of the hydrocarbons and other combustable materials in slurry 22 occurs. Any of slurry 22 that is not combusted upon contact with ignited sinter mix 52 is drawn down through the burning sinter mix 52 so that combustion may occur. Thus, gases discharged from stack 68 are substantially free of uncombusted hydrocarbons. In addition, vapor and combustion products developed from volatilization and combustion of slurry 22 are drawn through bed 44 by the downdraft and discharged through stack 68.

Application of slurry 22 to bed 44 prior to ignition of sinter mix 52 could permit materials having a relatively low boiling point to be drawn through bed 44 and discharged into the atmosphere in uncombusted form. The downdraft created by vacuum apparatus 48 ensures that the portion of slurry 22 having a relatively low mass is drawn through bed 44 where substantially complete combustion may occur. Finally, after slurry 22 is sprayed onto bed 44 and substantially completely combusted, vacuum apparatus 48 draws the air, fines, and products of combustion through electrostatic precipitator 70 to separate particulate matter from the clean gases, which are discharged through stack 68.

Figure 4:
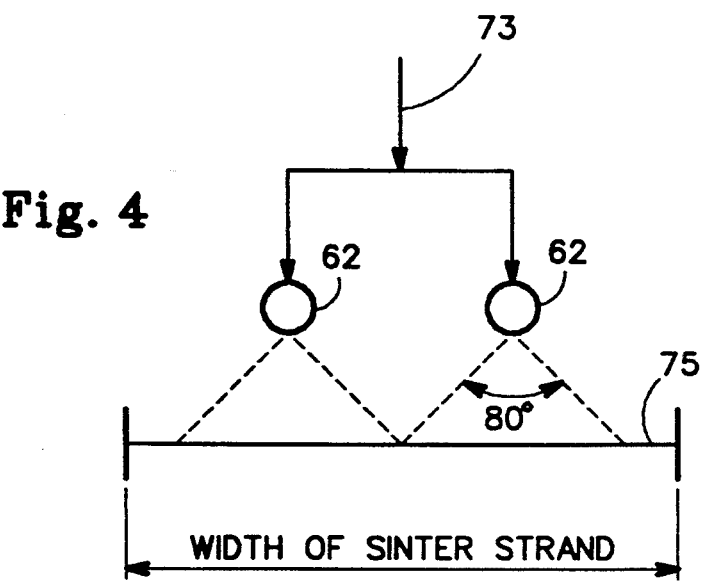
FIG. 4 is an illustration of the configuration of nozzles for injecting waste onto the sinter strand.

Pump 72, as best shown in FIG. 1, delivers slurry 22 through supply line 73 for application to bed 44 through nozzles 62. Nozzles 62 are arranged transversely to the direction of movement of bed 44. Spray coverage over bed 44 is provided using at least two 80° V-jet nozzles, as best shown in FIG. 4. Nozzles 62 are arranged to spray slurry 22 over less than the full width of bed 4—4. Spraying beyond the lateral edges 74 and 75 could allow escape or discharge of uncombusted material to stack 68. Overlap of the spray could cause adverse cooling of bed 44 which could reduce the quality of the clinker. For a twelve (12) foot wide strand, two 80° V-jet nozzles have been used to provide spray coverage over approximately ten (10) feet of the width of the strand with no overlap at the center.

Suitable nozzles 62 are available from Spraying Systems Co. of Wheaton, Ill. Nozzles 62 have a stainless steel body, and a high alumina, zirconium oxide refractory lining providing good wear resistance to the highly abrasive slurry 22. The refractory lining also provides temperature resistance, necessary because nozzles 62 are located within the high temperature environment of burner hood 46. Nozzles constructed from refractory materials alone may also be used, thereby eliminating the need to match the coefficient of thermal expansion of the stainless steel with that of the refractory material. Nozzles 62 atomize the slurry so that the median volume diameter of the droplets is between about 220 and 2500 microns.

The mass of slurry 22 sprayed onto bed 44 must take into account the speed of travel of bed 44, the thickness of mix 52, and the temperature within burner hood 46. Additionally, the water content of slurry 22 must be accounted for. Application of too much slurry 22 could overly cool the burning mix 52, thereby adversely affecting sinter quality or precluding complete combustion of the constituents of slurry 22. It has been found that clinker of the proper size and composition are produced with a flow rate of about 10 to 30 gallons per minute (gpm) of slurry 22 at a pressure of about 10 to 70 psi. A flow rate of about 30 gpm at about 40 psi has been found to achieve combustion of substantially all sludge 18 produced daily at WWTP 10 without adverse effect on sinter quality.

In addition to combusting the current daily generation of sludge 18, the process of the present invention may be used to combust sludge 76 previously produced at WWTP 10 and landfilled or otherwise stored. Stored sludge 76 may be transported to reslurrying equipment 78 for screening and rewatering to create slurry 22 having a solids content of about 25% and particulates smaller than about one-eighth (⅛) inch. Slurry 22 would then be delivered to sinter plant 40 for application onto bed 44 as described above.

Application of slurry 22 is relatively easily accomplished without substantial alteration of the existing equipment or operation of the steel making plant. In particular, the sinter strand 42 principally requires only the addition of nozzles 62 within burner hood 46 downstream of ignition point 60 of sinter mix 52. Additionally, sinter screens 80 and cooler 82 need not be affected, nor most of the other standard components of sinter plant 40.

While this invention has been described as having a preferred design, it is understood that it is capable of further modifications, uses and/or adaptations of the invention, following the general principle of the invention and including such departures from the present disclosure as have come within known or customary practice in the an to which the invention pertains, and as may be applied to the central features hereinbefore set forth, and fall within the scope of the invention of the limits of the appended claims.

What I claim is:

1. A process for combusting sludges, comprising the steps of:
   a) providing a sinter strand, the sinter strand including a porous bed movable between remote first and second ends, a burner hood operably associated with the bed intermediate the ends, and a vacuum source operably associated with the bed for applying a vacuum thereto;
   b) depositing onto the porous bed at the first end material to be sintered, and causing the material to be moved by the bed toward the second end;
   c) igniting within the burner hood the material to be sintered and causing sintering thereof to begin and to continue as the material continues to be moved by the porous bed toward the second end;
   d) applying a slurry; onto the ignited material as the material is being moved by the porous bed within the burner hood and thereby causing the slurry to be combusted within the hood; and
   e) continuing to move the porous bed and thereby the ignited material toward the second end.

2. The process of claim 1, including the steps of:
   a) providing a sludge containing volatile components; and
   b) adding sufficient water to the sludge to thereby create the slurry.

3. The process of claim 2, including the step of:
   a) adding sufficient water to the sludge so that the slurry is about 25 percent by weight solids.

4. The process of claim 3, including the step of:
   a) screening particulate materials contained in the sludge so that particulates in the slurry have a mesh size of less than ⅛ inch.

5. The process of claim 1, including the step of:
   a) applying the slurry at a pressure of about 10 to 70 psi.

6. The process of claim 5, including the step of:
   a) applying the slurry at a rate of about 10 to about 30 gallons per minute.

7. The process of claim 1, including the step of:
   a) operating the sinter strand at a temperature of about 2300° to about 2700° F.

8. The process of claim 1, including the step of:
   a) applying the slurry through at least a first spray nozzle.

9. The process of claim 8, including the step of:
   a) applying the slurry through at least first and second spray nozzles disposed transversely to the direction of movement of the bed.

10. The process of claim 9, including the step of:
    a) spraying the slurry over about 80% of the width of the bed.

11. The process of claim 8, including the step of:
    a) spraying the slurry in atomized form.

12. The process of claim 11, including the step of:
    a) atomizing the slurry so that the median volume diameter of the droplets is between about 220 and 2500 microns.

13. Apparatus for the combustion of volatile sludge, comprising:
    a) a sinter strand comprising a porous bed movable between remote first and second ends for carrying thereon sinter mix to be sintered, a burner hood located above a portion of said bed intermediate said ends, and a vacuum source operably associated with said bed for applying a vacuum thereto;

b) at least a first gas burner within said hood for igniting material being carried by said bed; and c) at least a first spray nozzle within said burner hood downstream of said gas burner for applying sludge to material ignited by said gas burner carried by said bed.

14. The apparatus of claim 13 further including slurry making equipment for screening and rewatering sludge to create a pumpable slurry.

15. The apparatus of claim 13 wherein said nozzle is a V-jet nozzle.

16. The apparatus of claim 15 wherein said nozzle is comprised of stainless steel and has a refractory lining.

17. The apparatus of claim 15 wherein said nozzle is constructed of refractory material.

18. The apparatus of claim 14 further including a pump for applying the slurry to the bed at a flow rate of about 10 to 30 gpm and a pressure of about 10 to 70 psi.

19. The apparatus of claim 18 wherein the pump applies said slurry at a flow rate of about 30 gpm and a pressure of about 40 psi.

20. The process of claim 1, including the step of:

a) causing combustion products from the slurry to be drawn downwardly through the porous bed by operation of the vacuum source.

* * * * *

UNITED STATES PATENT AND TRADEMARK OFFICE
CERTIFICATE OF CORRECTION

PATENT NO. : 5,382,279
DATED : January 17, 1995
INVENTOR(S) : Elmer D. Anderson, II It is certified that error appears in the above-indentified patent and that said Letters Patent is hereby corrected as shown below:

Col. 2, line 19, "some" should read --source--.

Col. 2, line 53, "fast" should read --first--.

Col. 5, line 67, "an" should read --art--.

Signed and Sealed this

Twenty-fourth Day of October, 1995

Attest:

BRUCE LEHMAN

Attesting Officer

Commissioner of Patents and Trademarks